United States Patent [19]

Kendall et al.

[11] 3,971,551

[45] July 27, 1976

[54] SHOCK ABSORBER

[75] Inventors: Giles A. Kendall, Burbank, Calif.;
William D. Wallace, Northfield, Ill.

[73] Assignees: Menasco Manufacturing Company,
Burbank, Calif.; **Miner Enterprises,
Inc.,** Chicago, Ill.

[22] Filed: July 21, 1975

[21] Appl. No.: 597,575

[52] U.S. Cl. .............................. 267/65 R; 188/276;
188/282; 188/317; 188/322; 267/124
[51] Int. Cl.² ........................................... F16F 5/00
[58] Field of Search .............. 267/64 R, 64 A, 65 R,
267/118, 124, 136; 188/276, 277, 282, 284,
297, 311, 314, 316, 317, 322; 213/43, 223

[56] References Cited
UNITED STATES PATENTS

| | | | |
|---|---|---|---|
| 2,348,160 | 5/1944 | Thornhill | 267/64 R |
| 3,007,694 | 11/1961 | Bingaman | 267/64 R |
| 3,083,000 | 3/1963 | Perdue | 267/64 R |
| 3,870,287 | 3/1975 | McMahon | 267/65 R X |

*Primary Examiner*—Johnny D. Cherry
*Attorney, Agent, or Firm*—Darbo, Robertson & Vandenburgh

[57] ABSTRACT

A piston rod having a variable volume auxiliary chamber extends into a primary chamber in a casing. Normally open valve means are arranged between the primary and auxiliary chambers which are filled with a compressible medium and which are in communication when the shock absorber is at rest. The variable volume auxiliary chamber accommodates changes in volume of the compressible medium resulting from changes in temperature of the medium. When impact forces are imposed on the piston rod, initial movement of the piston rod closes the valve means and subsequent movement of the piston rod into the primary chamber reduces the volume of the compressible medium therein thereby effecting energy absorption.

9 Claims, 7 Drawing Figures

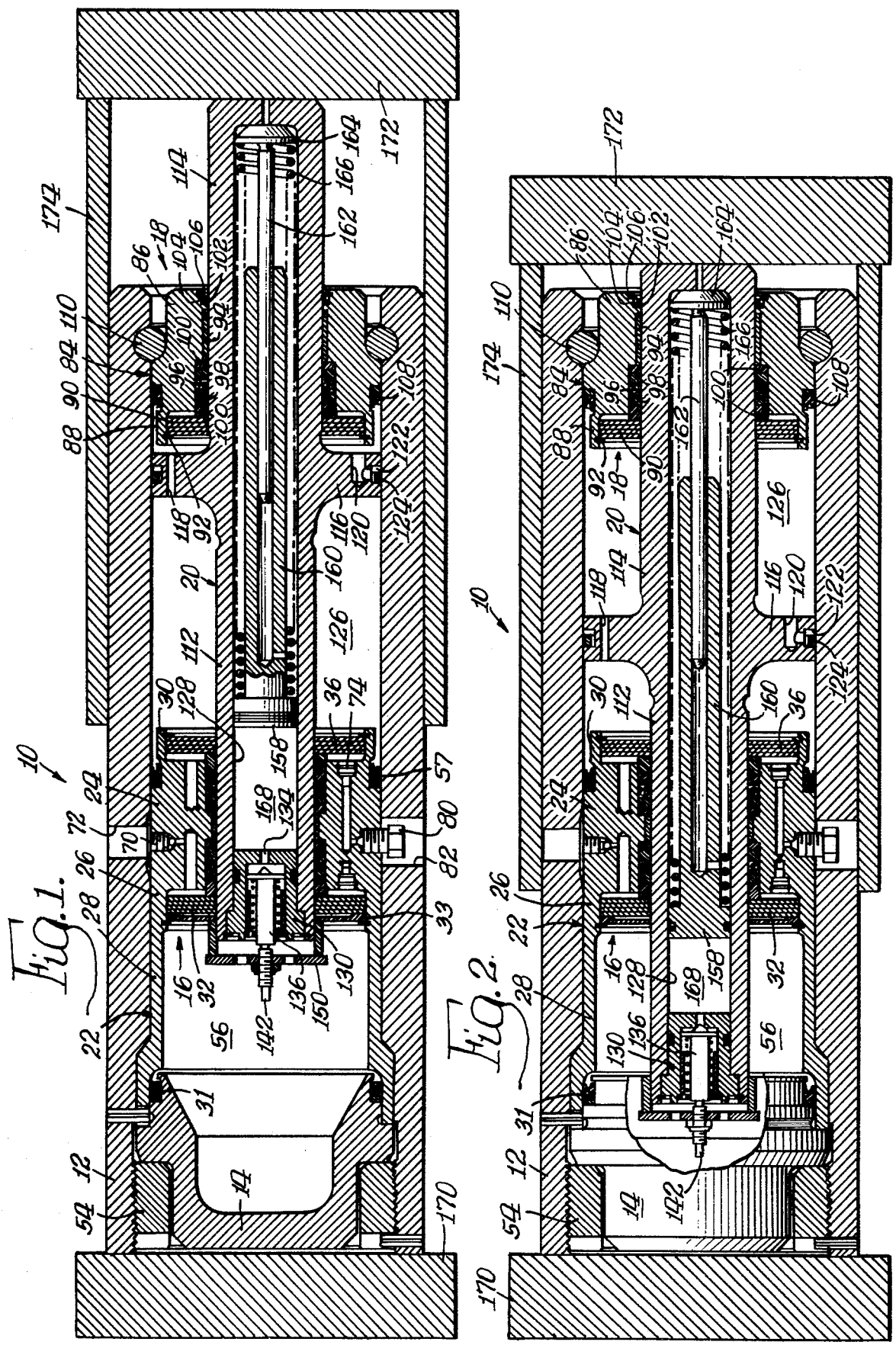

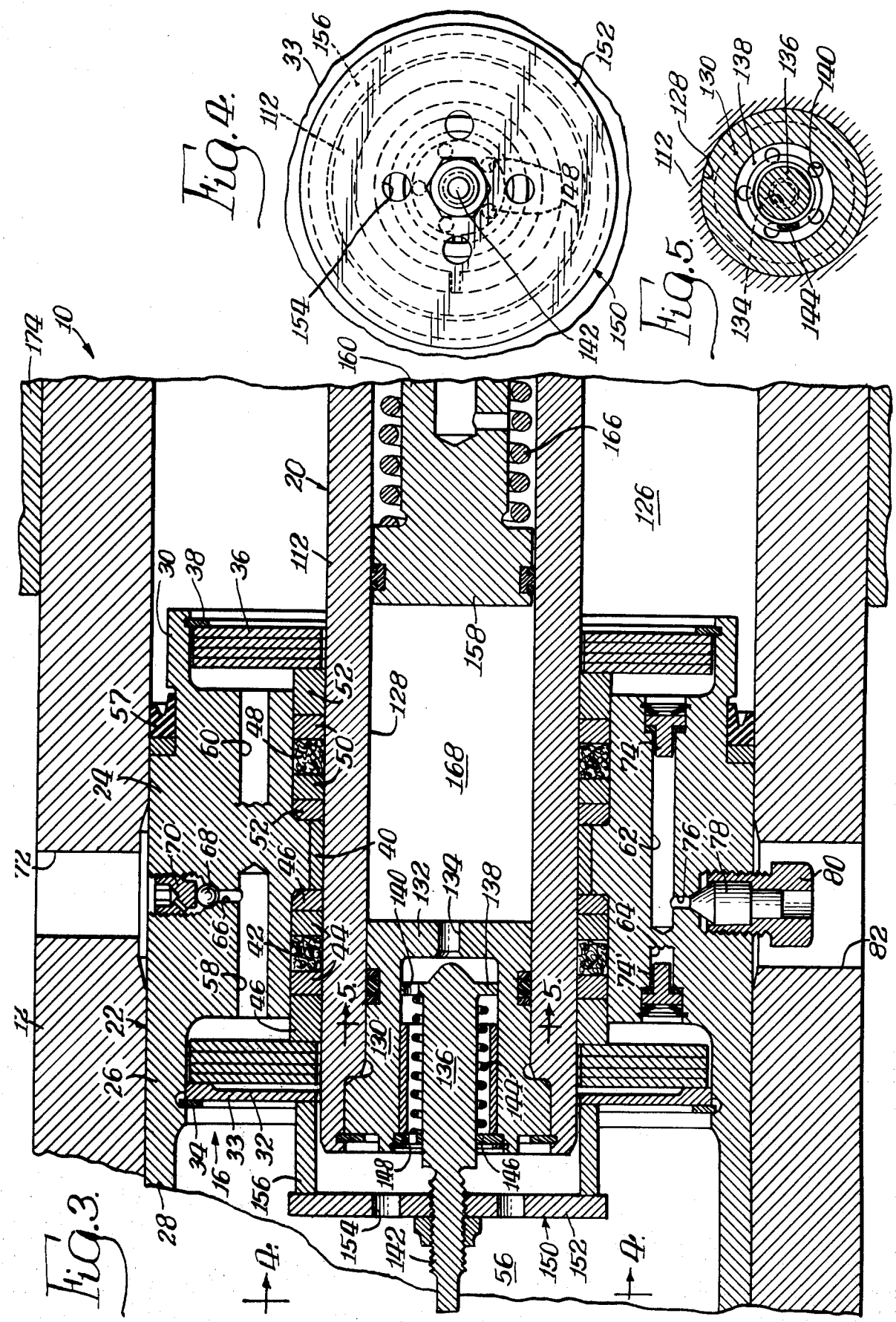

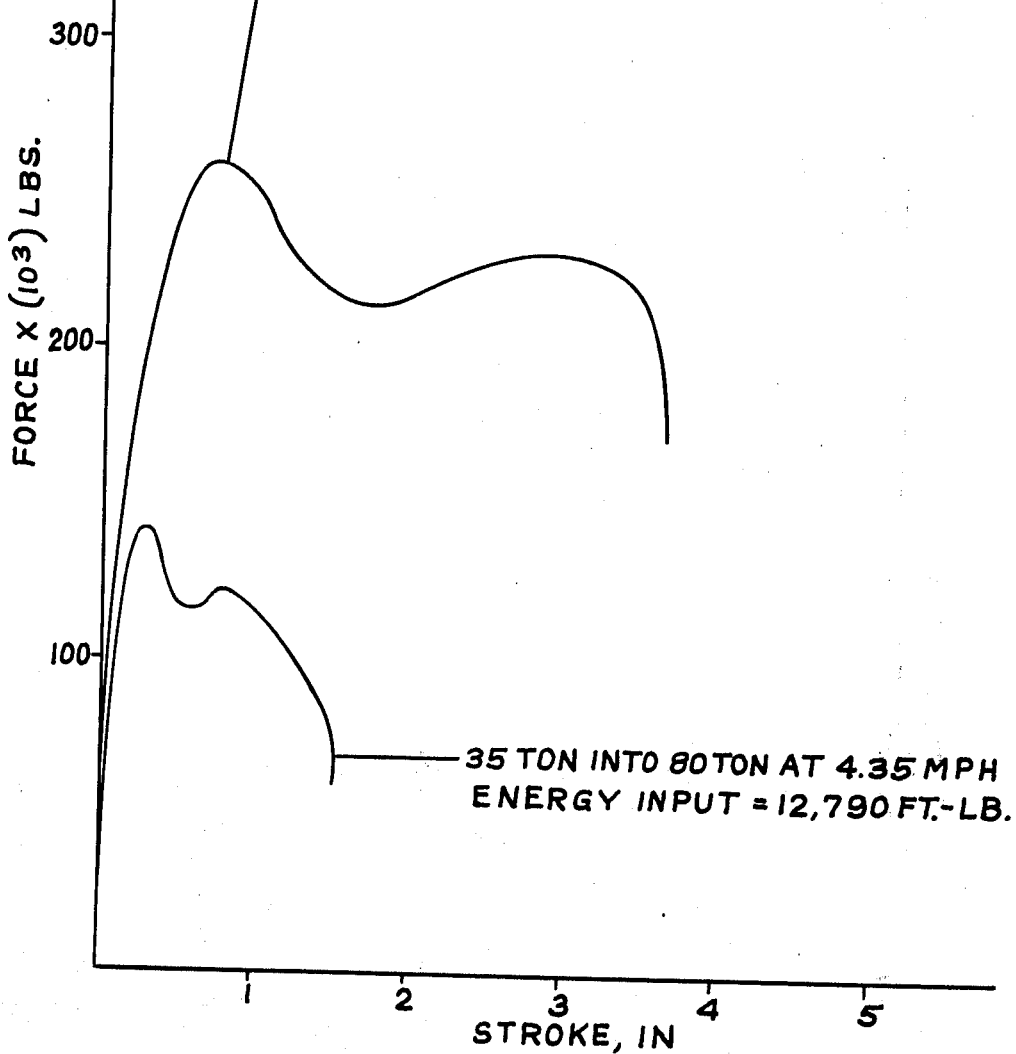

3,971,551

SHOCK ABSORBER

FIELD OF THE INVENTION

The present invention relates to a shock absorber especially adapted for use in railroad, aircraft and machine tool applications where relatively high energy absorption, and temperature compensation, are desired.

SUMMARY OF THE INVENTION

It is a primary object of the present invention to provide a shock absorber utilizing a compressible medium accompanied by means for temperature compensation.

The shock absorber of the present invention comprises an elongated casing with a primary chamber therein. A piston rod, having a variable volume auxiliary chamber therein, extends at its rear end into the primary chamber. The piston rod has aperture means adjacent the rear end thereof for placing the primary and auxiliary chambers in communication. A compressible medium fills the primary and auxiliary chambers, and the variable volume auxiliary chamber accommodates changes in volume of the compressible medium resulting from changes in temperature of the medium. Valve means are engaged with the aperture means for closing the latter, and interrupting communication between the primary and auxiliary chambers, as the rear end of the piston rod initially moves into the primary chamber. As the rear end of the piston rod thereafter moves into the primary chamber, the piston rod reduces the volume of the compressible medium in the chamber, and the compressible medium thereby provides a damping and spring force on the piston rod for absorbing the energy of inpact forces imposed on the piston rod.

It is another object of the present invention to provide a shock absorber, as described, which effects dual or compound energy absorption.

In the accomplishment of this object, the casing of the shock absorber is provided with a secondary chamber therein. The piston rod extends through the secondary chamber and has a front section of larger diameter than the rear section. A piston, with axial orifice means, is provided on the piston rod within the secondary chamber intermediate the front and rear piston rod sections, and a compressible medium fills the secondary chamber. As the front piston rod section moves into the secondary chamber, the compressible medium in this chamber is reduced in volume and metered through the piston orifice means, whereby the compressible medium provides a damping and spring force on the piston and piston rod for absorbing, along with the compressible medium in the primary chamber, the energy of impact forces imposed on the piston rod.

BRIEF DESCRIPTION OF THE DRAWINGS

FIG. 1 is a median longitudinal section view of the shock absorber of the present invention;

FIG. 2 is a section view corresponding generally to FIG. 1 but shows the elements of the shock absorber in a changed position;

FIG. 3 is a sectional view, on an enlarged scale, of the central portion of the shock absorber of FIG. 1;

FIG. 4 is a transverse sectional view taken substantially along the line 4—4 in FIG. 3 looking in the direction indicated by the arrows;

FIG. 5 is a transverse sectional view taken substantially along the line 5—5 in FIG. 3 looking in the direction indicated by the arrows;

FIG. 7 is a series of curves illustrating the theoretical energy capacity of a typical shock absorber, constructed in accordance with FIG. 1, under dynamic conditions.

DESCRIPTION OF THE PREFERRED EMBODIMENT

Figure 6:
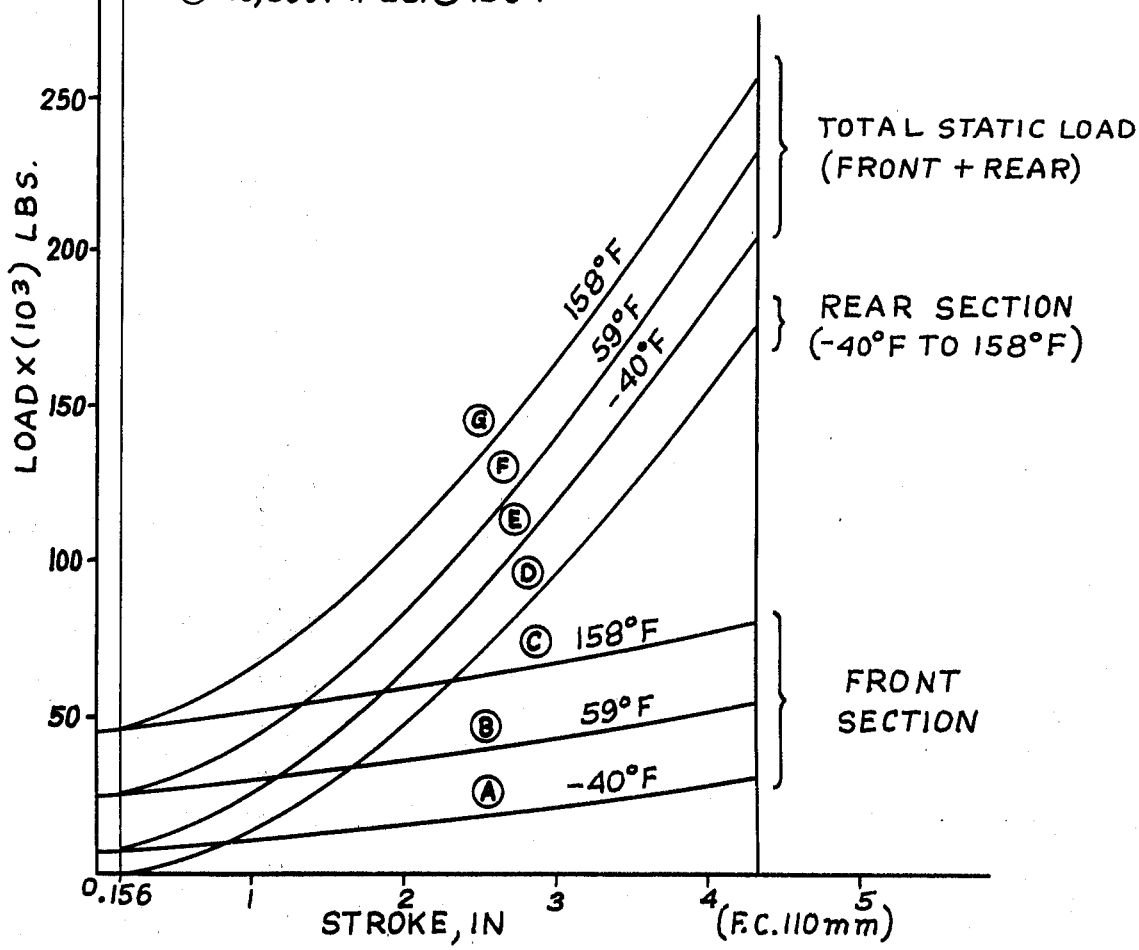
FIG. 6 is a series of curves illustrating the theoretical energy capacity of a typical shock absorber, constructed in accordance with FIG. 1, under static conditions at different temperatures.

Referring now to FIG. 1, the shock absorber 10 of the present invention comprises an elongated cylindrical casing 12. Mounted therein are a left- or rear-end cup-shaped bulkhead or closure member 14, an intermediate annular piston rod bearing and seal assembly 16, and a right- or front-end annular piston rod bearing and seal assembly 18. Extending into the casing 12 and through the assemblies 16 and 18 is a piston rod 20.

As shown in FIGS. 1 and 3, the intermediate piston rod bearing and seal assembly 16 includes an annular support body or member 22 having a main section 24, a rear axial flange section 26 with an axial extension portion 28, and a front axial flange section 30. A seal 31 is interposed between the outer periphery of the rear closure member 14 and the inner perpiphery of the rear flange extension portion 28. Disposed within the rear flange section 26 are a group of washers 32 and a stop member 33 limited in rearward movement by a snap ring 34, and disposed within the front flange section 30 are a group of washers 36 limited in forward movement by a snap ring 38. Mounted at the inner periphery of the main body section 24, intermediate of the ends thereof, is a bearing 40; arranged between the rear washers 32 and the bearing 40 are a seal 42, back-up rings 44, and spacer rings 46; and arranged between the bearing 40 and the front washers 36 are a seal 48, back-up rings 50, and spacer rings 52. The rear closure member 14 and the intermediate assembly 16 are held in place by a nut 54, and serve to define a primary chamber 56 within the casing 12. A seal 57 is interposed between the outer periphery of the support member 22 and the inner periphery of the casing 12.

The main section 24 of the annular support member 22 is formed with a plurality of axial passageways 58, 60, 62 and 64. The passageway 58 at its outer end opens adjacent the rear washers 32, and at its inner end communicates with a radial bleed port 66 in which a ball bleed valve 68 is normally seated by an apertured set screw 70 accessible through an opening 72 in the casing 12. The bleed valve 68 is conditioned for unseating by threading the set screw 70 outwardly. The passageway 60 at its outer end opens adjacent the front washers 36, and at its inner end communicates with a bleed port and a bleed valve (not shown) similar to the bleed port 66 and bleed valve 68. The passageways 58 and 60, and their associated bleed ports and bleed valves (when conditioned for unseating), accommodate the bleeding of air from the shock absorber. The passageway 62 at its outer end is provided with a check valve member 74, and its inner end communicates with a radial charging port 76 selectively closed by a removable plug 78 and a lock nut 80 accessible through an opening 82 in the casing 12. The passageway 64 at its outer end is provided with a check valve member 74', and at its inner end communicates with a radial charging port (not shown) corresponding to the charging port 76. The passageways 62 and 64, and their associated charging ports (when open), accommodate the introduction of a compressible medium into the chambers 56 and 126 during charging of the shock absorber.

As shown in FIG. 1, the front piston rod bearing and seal assembly 18 includes an annular support body or member 84 having a main section 86 and a rear axial flange section 88. Disposed within the flange section 88 are a group of washers 90 limited in rearward movement by a snap ring 92. Mounted at the inner periphery of the main body section 86, adjacent the front end thereof, is a bearing 94; arranged between the washers 90 and the bearing 94 are a seal 96, back-up rings 98, and spacer rings 100; and arranged outboard of the bearing 94 are a scraper 102 and a back-up ring 104 retained in place by a snap ring 106. A seal 108 is interposed between the outer periphery of the main body section 86 and the inner periphery of the casing 12, and an annular retainer member 110 serves to restrain the assembly 18 against forward movement.

As shown in FIGS. 1 and 3 the piston rod 20 is comprised of a rear section 112, and a front section 114 of larger diameter than the rear section 112. The rear piston rod section 112 is slidably guided in the intermediate bearing assembly 16 and extends into the primary chamber 56, while the front piston rod section 114 is slidably guided in the front-end bearing assembly 18 and extends outwardly of the casing 12. Formed on the piston rod 20 intermediate of the rear and front piston rod sections 112 and 114 is a piston 116. The piston 116 is provided with a plurality of circumferentially spaced apart axial ports 118, and with a plurality of circumferentially spaced apart elbow ports 120 communicating between the front side of the piston 116 and an annular radial groove 122 in which a floating piston ring 124 is disposed. The intermediate and front assemblies 16 and 18 serve to define, within the casing 12, a secondary chamber 126 in which the piston 116 is axially movable.

Referring now to FIGS. 3-5, the piston rod 20 is formed with a central axial bore 128 in the rear end of which is secured a sleeve member 130 having a front radial wall 132 with a central axial aperture 134 therethrough. Axially slidable in the sleeve member 130 is a valve member 136 having an inner radial flange portion 138 with circumferentially spaced apart axial ports 140, and an outer axial valve stem portion 142. A coil spring 144, interposed between the valve flange 138 and a base ring 146 having circumferentially spaced apart axial ports 148, serves to bias the valve member 136 toward engagement with the aperture 134 for closing the latter. Secured on the valve stem portion 142 is a valve lifter 150 comprised of a radial plate 152 with circumferentially spaced apart axial apertures 154, and an axial collar 156 slidable on the piston rod section 112 and engageable with the stop member 33 of the intermediate bearing assembly 16 when the piston rod 20 is at normal rest to maintain the valve member 136 disengaged from the aperture 134.

Referring back to FIG. 1, a piston 158 is axially movable within the piston rod bore 128. The piston 158 is formed at the rear end of a tubular piston rod 160 slidably mounted on a guide pin 162 having a base flange 164 seated against the forward end wall of the piston rod 20. A spring 166 is interposed between the base flange 164 and the piston 158 for biasing the latter rearwardly. The sleeve member 130 and the piston 158 serve to define an auxiliary chamber 168 within the piston rod 20. When mounting the shock absorber 10 for shock absorption, the rear end of the casing 12 may be seated against a stationary frame member 170, while the forward end of the piston rod 20 may be engaged against a movable frame member 172 having a rear sleeve member 174 slidably guided on the casing 12.

To render the shock absorber 10 operational, the primary, auxiliary and secondary chambers 56, 168 and 126 are filled with a compressible medium: for example, a compressible liquid such as silicone oil, or a compressible solid such as silicone rubber. More particularly, a compressible medium is introduced into the secondary chamber 126 under a predetermined charging pressure corresponding to the shock absorbing characteristics desired. Likewise, a compressible medium is introduced into the primary chamber 56 under a predetermined charging pressure corresponding to the shock absorbing characteristics desired. While the shock absorber 10 is at rest as shown in FIG. 1, the valve lifter 150 maintains the valve member 136 disengaged from the aperture 134. Therefore, the aperture 134 places the auxiliary chamber 168 in communication with the primary chamber 56, and the compressible medium introduced into the primary chamber 56 is also introduced into the auxiliary chamber 168. In this connection, the spring 166, which operates on the piston 158, is selected to maintain the compressible medium within the primary and auxiliary chambers 56 and 168 under the initial predetermined charging pressure after charging has been completed. Moreover, the spring biased piston 158 is axially movable, and hence the auxiliary chamber 168 presents a variable volume, to allow or accommodate changes (i.e., either increases or decreases) in the volume of the compressible medium resulting from changes in the temperature of the medium. The variable volume auxiliary chamber 168 thus serves as a temperature compensator.

In the operation of the shock absorber 10, impact forces imposed on the piston rod 20 cause the latter to move inwardly of the casing 12 from the position shown in FIG. 1 toward the position shown in FIG. 2. As the front piston rod section 114 enters the secondary chamber 126 while the rear piston rod section 112 moves out, the volume of the chamber 126 is reduced to the extent that displacement by the section 114 exceeds the displacement by the section 112, thus increasing the pressure of the compressible medium in the chamber 126. Concurrently, the compressible medium is metered through the piston ports 118 thereby producing a throttling effect. The desired volume-pressure change of the compressible medium in the chamber 126, and the attendant throttling effect, impose a damping and spring force on the piston 116 and piston rod 20, and thereby serve to dissipate the energy of the impact forces imposed on the piston rod 20.

In addition, as the piston rod 20 moves inwardly of the casing 12, the rear piston rod section 112 moves into the primary chamber 56. Initially, the valve lifter 150 is disengaged from the stop member 33, and the spring 144 causes the valve member 136 to engage the aperture 134 thereby closing the latter and interrupting communication between the primary and auxiliary chambers 56 and 168. Thereafter, as the rear piston rod section 112 enters the primary chamber 56, the volume of the chamber 56 is reduced to the extent of displacement by the rear piston rod section 112, thus increasing the pressure of the compressible medium in the chamber 56. The described volume-pressure change of the compressible medium in the chamber 56 imposes a damping and spring force on the piston rod 20, and thereby serves, in conjunction with movement of the piston 116 and piston rod 20 in the secondary chamber 126, to dissipate the energy of impact forces imposed on the piston rod.

The theoretical static energy absorbing characteristics of a typical shock absorber embodying the principles of the present invention are shown in FIG. 6: curves A, B and C illustrate the characteristics of the front shock absorber section; curve D, the characteristics of the rear shock absorber section; and curves E, F and G, the characteristics of the total shock absorber. The theoretical dynamic energy absorbing characteristics of a corresponding shock absorber are illustrated in the curves of FIG. 7.

When the impact forces are fully dissipated, or removed from the piston rod 20, the pressure of the compressible medium, acting on the rear piston rod section 112 within the primary chamber 56 and on the unbalanced area between the rear and front piston rod sections 112 and 114 within the secondary chamber 126, causes the piston rod 20 to return to the normal rest position shown in FIG. 1. During the return stroke of the piston rod 20, the compressible medium within the secondary chamber 126 flows back through the piston ports 118 to fill the space being vacated by the piston 116. Also, the valve lifter 150 is reengaged with the stop member 33 and the valve member 136 is disengaged from the aperture 134 thereby opening the latter and reestablishing communication between the primary and auxiliary chambers 56 and 168.

While there has been shown and described a preferred embodiment of the present invention, it will be understood by those skilled in the art that various rearrangements and modifications may be made therein without departing from the spirit and scope of the invention.

The invention claimed is:

1. A shock absorber comprising an elongated casing with a primary chamber therein, a piston rod having a variable volume auxiliary chamber therein and extending at its rear end into said primary chamber, said piston rod having aperture means adjacent said rear end thereof for placing said primary and auxiliary chambers in communication, valve means adjacent said aperture means and normally disengaged therefrom, a compressible medium filling said primary and auxiliary chambers, said variable volume auxiliary chamber accommodating changes in volume of said compressible medium resulting from changes in temperature of said medium, said valve means being engaged with said aperture means for closing the latter and interrupting communication between said primary and auxiliary chambers as said rear end of said piston rod initially moves into said primary chamber, and said compressible medium in said primary chamber providing a damping and spring force on said piston rod as said rear end of said piston rod thereafter moves into said primary chamber and reduces the volume of said compressible medium therein.

2. The shock absorber of claim 1 wherein said primary chamber is defined by a rear end closure member and an intermediate annular piston rod bearing and seal assembly; and wherein said intermediate piston rod bearing and seal assembly includes an annular support member having a main body section and a rear axial flange section, at least one washer disposed within said rear flange section, a bearing mounted in the inner periphery of said main body section and slidably supporting said piston rod, and seal means arranged between said washer and said bearing.

3. The shock absorber of claim 1 wherein said aperture means is formed in a sleeve member which is secured in said rear end of said piston rod and which defines in part said auxiliary chamber; and wherein said valve means includes a valve member axially slidable in said sleeve member, a spring biasing said valve member toward engagement with said aperture means for closing the latter, and a valve lifter secured to said valve member and engageable with a stop member when said piston rod is at normal rest to maintain said valve member disengaged from said aperture means.

4. The shock absorber of claim 1 wherein said auxiliary chamber is defined in part by a spring biased piston which is axially movable within said piston rod and which maintains said compressible medium under an initial predetermined pressure and yet allows changes in volume of said compressible medium resulting from changes in temperature of said medium.

5. The shock absorber of claim 1 wherein said casing has a secondary chamber therein, said piston rod extends through said secondary chamber and has front and rear sections, said front piston rod section is of larger diameter than said rear piston rod section, a piston is provided on said piston rod within said secondary chamber intermediate said front and rear piston rod sections and presents axial orifice means, and a compressible medium fills said secondary chamber for providing a damping and spring force on said piston rod and said piston as said front piston rod section moves into said secondary chamber and reduces the volume of said compressible medium therein.

6. The shock absorber of claim 5 wherein said secondary chamber is defined in part by a front annular piston rod bearing and seal assembly; and wherein said front piston rod bearing and seal assembly includes an annular support member having a main body section and a rear axial flange section, at least one washer disposed within said rear flange section, a bearing mounted in the inner periphery of said main body section and slidably supporting said front piston rod section, and seal means arranged between said washer and said bearing.

7. The shock absorber of claim 6 wherein said primary chamber is defined by a rear end closure member and an intermediate annular piston rod bearing and seal assembly, and said secondary chamber is defined by said intermediate piston rod bearing and seal assembly and said front piston rod bearing and seal assembly; and wherein said intermediate piston rod bearing and seal assembly includes an annular support member having a main body section and a rear axial flange section and a front axial flange section, at least one rear washer disposed within said rear flange section, at least one front washer disposed within said front flange section, a bearing mounted in the inner periphery of said main body section and slidably supporting said rear piston rod section, seal means arranged between said rear washer and said bearing, and seal means arranged between said bearing and said front washer.

8. The shock absorber of claim 7 wherein said aperture means is formed in a sleeve member which is secured in said rear end of said piston rod and which defines in part said auxiliary chamber; and wherein said valve means includes a valve member axially slibable in said sleeve member, a spring biasing said valve member toward engagement with said aperture means for closing the latter, and a valve lifter secured to said valve member and engageable with said intermediate piston rod bearing and seal assembly when said piston rod is at normal rest to maintain said valve member disengaged from said aperture means.

9. The shock absorber of claim 8 wherein said auxiliary chamber is defined in part by a spring biased piston which is axially movable within said piston rod and which maintains said compressible medium within said primary and auxiliary chambers under an initial predetermined presure and yet allows changes in volume of said compressible medium resulting from changes in temperature of said medium.

* * * * *